United States Patent [19]
Buxton et al.

[11] Patent Number: 6,118,427
[45] Date of Patent: Sep. 12, 2000

[54] GRAPHICAL USER INTERFACE WITH OPTIMAL TRANSPARENCY THRESHOLDS FOR MAXIMIZING USER PERFORMANCE AND SYSTEM EFFICIENCY

[75] Inventors: William A.S. Buxton; Beverly L. Harrison, both of Toronto; Kim J. Vicente, Etobicoke, all of Canada

[73] Assignee: Silicon Graphics, Inc., Mountain View, Calif.

[21] Appl. No.: 08/634,211

[22] Filed: Apr. 18, 1996

[51] Int. Cl.[7] .................................................. G09G 5/00
[52] U.S. Cl. ...................................... 345/113; 345/435
[58] Field of Search .................................... 345/113, 114, 345/115, 339, 340, 343, 344, 345, 435; 348/586

[56] References Cited

U.S. PATENT DOCUMENTS

| | | | |
|---|---|---|---|
| 4,591,897 | 5/1986 | Edelson | 345/113 |
| 4,827,253 | 5/1989 | Maltz | 345/113 |
| 4,982,343 | 1/1991 | Hourvitz et al. | 364/521 |
| 5,017,143 | 5/1991 | Backus et al. | 348/586 |
| 5,283,560 | 2/1994 | Bartlett | 345/113 |
| 5,355,446 | 10/1994 | Maayan . | |
| 5,428,724 | 6/1995 | Silverbrook . | |
| 5,442,788 | 8/1995 | Bier | 395/650 |
| 5,473,737 | 12/1995 | Harper | 345/431 |

(List continued on next page.)

FOREIGN PATENT DOCUMENTS

| | | |
|---|---|---|
| 635779 A1 | 1/1995 | European Pat. Off. . |
| 635780 A1 | 1/1995 | European Pat. Off. . |
| 635781 A1 | 1/1995 | European Pat. Off. . |

OTHER PUBLICATIONS

Harrison et al., "An Experimental Evaluation of Transparent User Interface Tools and Information Content," Proc. of the ACM Symposium on UIST, (1995), pp. 81–90.

Bier et al., "A Taxonomy of See–Through Tools," Proceedings of CHI '94, Boston, MA, pp. 358–364.

Bier et al., "Toolglass and Magic Lenses: The See–Through Interface," Proceedings of SIGGRAPH '93, Ahaheim, CA, pp. 73–80.

Harrison, B. L., et al., "Transparent Layered User Interfaces: An Evaluation of a Display Design to Enhance Focused and Divided Attention," Proceedings of CHI '95, Denver, Colorado, pp. 317–324.

Ishii et al., Clearboard: A Seamless Medium for Shared Drawing and Conversation with Eye Contact, Proceedings of CH '92, Monterey, CA, pp. 525–532.

(List continued on next page.)

Primary Examiner—Steven J. Saras
Assistant Examiner—Paul A. Bell
Attorney, Agent, or Firm—Sterne, Kessler, Goldstein & Fox P.L.L.C.

[57] ABSTRACT

A system and method for providing a graphical user interface (GUI) for maximized user performance and system efficiency. The GUI utilizes variable-transparency to merge images (or layers) of objects onto a graphical display. For example, "see through" objects (such as menus, tool palettes, windows, dialogue boxes, or screens) are superimposed over similar objects or different background content (such as text, wire-frame or line art images, or solid images). A critical factor in the usability of variably-transparent GUI is the effect of visual interference on user performance. That is, the interaction between superimposed objects of varying types measurably alters performance to unacceptable levels in terms of user selection error rates and response times. The present invention provides a system and method of using optimal threshold transparency levels for user performance optimization. Correspondingly, the present invention does not substantially rely on visual enhancement techniques within the transparency ranges delineated by the optimal thresholds, thereby providing enhanced system efficiency. Additionally, the present invention provides hybrid windows having both variably-transparent regions and opaque regions for further performance gains.

24 Claims, 8 Drawing Sheets

U.S. PATENT DOCUMENTS

| | | | |
|---|---|---|---|
| 5,475,812 | 12/1995 | Corona et al. | 345/344 |
| 5,479,603 | 12/1995 | Stone et al. | 395/161 |
| 5,487,145 | 1/1996 | Marsh et al. | 345/501 |
| 5,530,795 | 6/1996 | Wan | 345/332 |
| 5,561,811 | 10/1996 | Bier | 395/825 |
| 5,581,670 | 12/1996 | Bier et al. | 395/326 |
| 5,590,265 | 12/1996 | Nakazawa | 345/344 |
| 5,617,114 | 4/1997 | Bier et al. | 345/113 |
| 5,651,107 | 7/1997 | Frank et al. | 345/344 |
| 5,678,015 | 10/1997 | Goh | 345/340 |
| 5,737,554 | 4/1998 | Epelman-Wang et al. | 345/339 |

OTHER PUBLICATIONS

MacLeod, C., "Half a Century of Research on the Stroop Effect: An Integrative Review," *Psychological Bulletin*, vol. 109, No. 2, pp. 163–203, 1991.

Stone et al., "The Movable Filter as a User Interface Tool," Proceedings of Chi '94, Boston, MA, pp. 306–312.

Zhai et al., "The "Silk Cursor": Investigating Transparency for 3D Target Acquisition," Proceedings of CHI '92, Monterey, CA, pp. 525–532.

GRAPHICAL USER INTERFACE WITH OPTIMAL TRANSPARENCY THRESHOLDS FOR MAXIMIZING USER PERFORMANCE AND SYSTEM EFFICIENCY

RELATED APPLICATION

This application is related to commonly owned, co-pending application Ser. No. 08/978,524, file wrapper continuation of Application No. 08/634,185, filed on the same date herewith, titled "Graphical User Interface With Anti-Interference Outlines For Enhanced Variably-Transparent Applications."

BACKGROUND OF THE INVENTION

1. Field of the Invention

The present invention relates generally to a system and method for displaying images of objects. More particularly, the present invention relates to graphical user interfaces providing variably-transparent (transparent/semi-transparent) layered objects and optimizing the degree of transparency for maximum user and system performance.

2. Related Art

Graphical User Interfaces (GUIs) provide a gateway between users and virtually all types of application programs for visualizing and manipulating application-specific objects or information. A problem with GUIs has been efficiently displaying a number of objects (e.g., windows, menus, and tool palettes) within a limited display (e.g., computer screen or terminal) area. Indeed, the rather limited amount of display real estate relative to the increasing amount of information to be displayed presents a real and prevailing challenge to GUI design.

There have been generally two broad strategies to address the problem. The first entails a space multiplexing strategy. That is, the screen is partitioned (or tiled) into a number of non-overlapping windows. The second is a time multiplexing (or temporal sequencing) strategy. With these types of strategies, windows are arranged on top of one another, with only the top-most window being visible at any given time and a mechanism (e.g., a mouse interface) is provided to rapidly change which window is visible.

Conventionally, most GUIs have utilized hybrid approaches rather than either one of these strategies exclusively. For example, conventional GUIs typically provide both static or permanently visible windows and dynamic menus which are only visible by user selection or request (e.g., drop-down, pop-up, pull-down, and pull-out menus).

A disadvantage of any of these approaches is that some displayed images of objects (or displayed information) are completely or partially obscured, thereby blocking the context in which the user is working. That is, all objects that are below or behind a fully opaque window or menu are not visible to the user. Thus, when an opaque rectangular pull-down menu (foreground object) containing a list of user options is displayed, all object images (background objects) falling behind the menu are obstructed. This invariably has an adverse effect on the utility of conventional GUIs.

The extent of the disruption to the user is directly related to the persistence of the foreground object (i.e., how long the object remains displayed). In the case of menu item selection, obstruction is short-term. However, in the case of overlapping windows, for example, the length of time this obstruction exists is long-term. Accordingly, the visual disruption is persistent and highly problematic.

Recent advances in technology make it possible and often desirable to use variably-transparent (transparent/semi-transparent) windows, menus, or other objects such that the user can "see through" to underlying layers. Fully transparent interfaces include the Heads Up Displays (HUDs) used in aviation and the Clearboard system. See, Ishii et al., *Clearboard: A seamless medium for shared drawing and conversation with eye contact,* Proceedings of CHI'92, Monterey, Calif., 525–532. In the HUD systems, aircraft instrumentation (a graphical computer interface) is superimposed on the external real world scene, using specially engineered windshields. In the Clearboard system, a large drawing surface is overlaid on a video image of the user's collaborative partner, where the superimposed images are presented as a "drafting" table.

Similarly, in other rare instances, GUIs have also used semi-transparent (partially transparent or translucent) techniques, such as stippling. These techniques generally allow foreground object images (e.g., menus, tool palettes, work areas, or windows) to be superimposed over background object images, while permitting the background object images to remain visible to the user. Applications using such techniques include video overlays (e.g., sport scores overlaid on the game in play) and "3-D silk cursors." See, Zhai et al., *The "silk cursor:" Investigating transparency for 3D target acquisition,* Proceeding of CHI'94, Boston, Mass., 459–464.

A similar application involving semi-transparent menus (a class of interactive widgets) which do not completely block other object images on a computer display is disclosed in U.S. Pat. No. 5,283,560 to Bartlett. As such, images falling below the menus remain visible, thus making the menus less intrusive during menu operation.

Accordingly, variably-transparent GUIs allow multiple object image "layers" to be simultaneously observed. Correspondingly, these interfaces are instrumental in providing integration between user tool space and task space, between multiple tools, or between different object images. For example, such interfaces allow the user to interact with foreground objects, carry out activities, or change parameters that are ultimately reflected in a background layer (e.g., color changes, font changes, and view changes). Correspondingly, these GUIs provide the user with a more efficient mechanism to perform operations without being overly disruptive.

While solving one problem, these conventional variably-transparent GUIs create others, namely visual interference (i.e., reduced visibility and legibility). For example, when a foreground object (e.g., a widget) is made semi-transparent, object images below the widget tend to interfere with the legibility of the widget itself.

The degree of visual interference is generally a function of transparency. The higher the transparency of the foreground object, the higher the severity of the visual interference, wherein completely transparent foreground objects have the maximum interference from the background. As the degree of foreground transparency reduces toward opaque, the degree of visual interference is also reduced. This, however, mitigates the very advantage of variable-transparency since it significantly diminishes visibility of background object images.

Visual interference is particularly severe with foreground and background objects of similar colors (e.g., the color(s) of menu items closely matching the color(s) of background object images below the menu). Since any color may appear in the background (created/controlled by the application user), this can happen no matter which color is chosen for the text (icons etc.) on the widgets created by the application designer. Accordingly, visual interference generally precludes use of variable-transparency with a wide range of practical applications.

Some GUIs have simply circumvented the issue by relying on variations of conventional approaches (e.g., tiled opaque menus and windows). For the most part, those GUIs which have incorporated any form of transparency have not measured, specified, or determined what the levels of transparency should be implemented. Most have taken one of two approaches. Some GUIs utilize a predetermined transparency level of 100% clear which is not adjustable. See, Stone et al., *The Movable Filter as a User Interface Tool*, Proceedings of CHI'94, Boston, Mass., 306–312; Bier et al., *Toolglass and magic lenses: The see-through interface*, Proceedings of SIGGRAPH'93, Anaheim, Calif., 73–80; Bier et al., *A Taxonomy of See-Through Tools*, Proceedings of CHI'94, Boston, Mass., 358–364. Alternatively, the system designer typically makes an arbitrary decision and fixes the transparency level at a predetermined value.

Neither of these approaches, however, maximize user or system performance. Many such GUIs do not provide the user with control over the predetermined settings and therefore the transparency level cannot be altered in accordance with user or application requirements. In those instances where the user is provided some control, it is rarely apparent what the optimal settings should be or how these controls are set (i.e., what user interface mechanism is used to change or reset transparency levels). Moreover, the user is additionally burdened with another task (i.e., controlling/adjusting the transparency level) unrelated to the application/task goals, thus ultimately have a potential adverse effects on user efficiency and system performance.

SUMMARY OF THE INVENTION

The present invention is a system and method for providing a graphical user interface (GUI) with optimal transparency thresholds to maximize both user performance and system efficiency.

The GUI utilizes variable transparency to merge images (or layers) of objects onto a graphical display. For example, variably-transparent (transparent/semi-transparent) or "see through" objects (such as menus, tool palettes, windows, dialogue boxes, or screens) are superimposed over similar objects or different background content (such as text, wireframe or line art images, or solid images).

One prominent feature of the present invention is that it provides optimal transparency thresholds with respect to visual interference and user performance (in terms of selection response times and error rates). The inventors first systematically evaluated user performance at a variety of transparency levels to determine which levels represented thresholds of acceptable performance in terms of response time and error rates. These user derived values were then used to determine how to best take advantage of system hardware and software to subsequently produce the required transparency levels. By knowing in advance which transparency levels produce the optimal user performance, GUIs and other visual interfaces can be specifically tailored and optimized.

In particular, the present invention provides that there is no mathematical or statistical performance difference between the baseline (opaque) menus (or icons and windows) and approximately 50% transparent menus, independent of application context (e.g., word processing, 2D and 3D modeling, rendering, and line art). Correspondingly, the present invention, by utilizing the 50% optimal threshold as a default setting ensures, that all the advantages of transparency are realized without any adverse effects on user performance and system efficiency.

The present invention also provides other context specific optimal transparency ranges. For example, the maximum range for transparent icons (or iconic tool palettes) is approximately 75% transparent (i.e., 75% of background image and 25% of icon image).

The present invention further provides that solid image profiles (e.g., rendering, video, still images, or scanned images) are generally interference-resistant, having a maximum threshold value of approximately 90% transparency (i.e., 90% of background image and 10% of foreground image).

In addition to optimizations based on specifying transparency levels, the present invention provides further optimizations based on an examination of window objects or components with respect to transparency. Correspondingly, the present invention subdivides a window into a "surface area" and a "non-surface area." The surface area is defined to be the textured or colored backdrop of the window upon which non-surface objects are drawn. The present invention automatically provides transparency to the surface area of a window and then independently determines whether to apply transparency to the individual non-surface components.

In addition, the present invention provides specifically designed hybrid windows which include both variably-transparent and opaque regions for further optimization. The opaque regions are defined to be "selectable objects" within the window. Selectable objects (which are a subset of non-surface area objects) typically include buttons, sliders, radius indicators, etc. Accordingly these objects activate a command based on positioning the cursor over them and clicking mouse button or pressing any key on the keyboard.

Another significant feature of the present invention is enhanced system performance. That is, the optimal thresholds provided by the present invention facilitate more insightful use of visual enhancement techniques. For example, these thresholds allow system designers to predetermine the optimal transparency levels required by any particular application. As such, image blending techniques can be embodied in system hardware to allow fast computational performance. Alternatively, or in addition to, hardware algorithms using the predetermined optimal transparency levels can also be generated in high efficiency programming languages (i.e., by using assembly language, register-based operations, or look-up tables). Such optimizations are typically not cost-effective or efficient without the ability to predict the required parameters (e.g., transparency levels) in advance.

The foregoing and other features and advantages of the invention will be apparent from the following, more particular description of the preferred embodiments of the invention, as illustrated in the accompanying drawings.

BRIEF DESCRIPTION OF THE FIGURES

Referring now to the drawings which form a part of this original disclosure.

DETAILED DESCRIPTION OF THE PREFERRED EMBODIMENTS

The preferred embodiments of the invention are described with reference to the figures where like reference numbers indicate like elements. Also in the figures, the left most digit of each reference number corresponds to the figure in which the reference number is first used.

The preferred embodiments of the invention are discussed in detail below. While specific model numbers and/or configurations are discussed, it should be understood that this is done for illustration purposes only. A person skilled in the relevant art will recognize that other components and configurations may be used without parting from the spirit and scope of the invention.

Optimal Transparency Thresholds and Visual Interference

Figure 1:
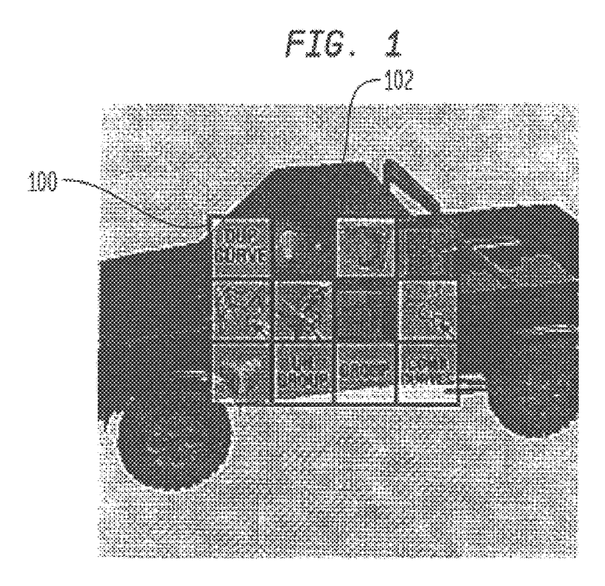
FIG. 1 illustrates a semi-transparent (50%) palette superimposed over a solid image.
Figure 2:
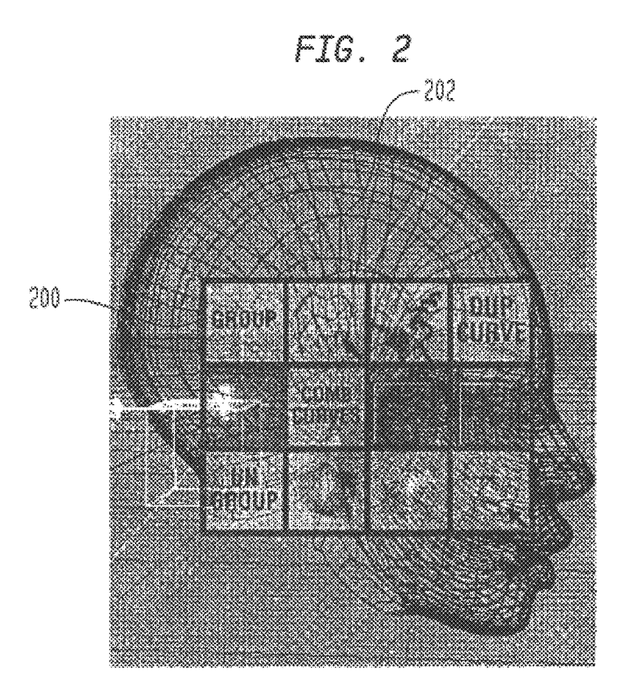
FIG. 2 illustrates a semi-transparent palette (50%) superimposed over a wire frame model.

The inventors conducted several studies to gain insight into which GUI parameters better support user attention and maintain fluency of work. The results of these studies illustrate the characteristics and the numerous advantages of the present invention. The study included using variably-transparent tool palettes (containing text icons, line art icons, and solid object icons) superimposed over different background content information: text, wire-frame or line art images, and solid images, to explores the issues of user attention and visual interference. For example, FIG. 1 and FIG. 2 illustrate palettes 100 and 200 (which are of same transparency level), superimposed image content 102 (solid image) and 202 (line art image).

With respect to variably-transparent GUIs there are generally three critical user attention components associated with visual interference: focused attention, divided attention, and "switching cost."

Visual interference impacts the user's ability to properly focus on tasks or objects. That is, a GUI typically presents multiple sources of objects (e.g,. tool palettes, work areas, or multiple windows) on the display, and the user correspondingly makes choices about what to attend to and when. At times, the user needs to focus exclusively (focused attention) on a single object without interference from other objects. At other times, the user typically needs to time-share (divided attention) between two or more objects of interest.

Thus, the user must be visually aware of multiple objects which overlap and obscure each other during various "tasks" (e.g., text editing, drawing, and animation). By their very nature, at any given instance, some tasks are relatively active while others are relatively passive. Correspondingly, the user requires only a peripheral awareness of passive tasks while requiring a greater focus on any particular active ask. The extent of this awareness determines the extent to which the user must focus or divide his/her attention.

Furthermore, task characteristics largely determine the user's attention requirements and minimum acceptable performance levels. These task characteristics are generally predetermined by the nature of the task and are therefore not under the exclusive GUI control.

Figure 3:
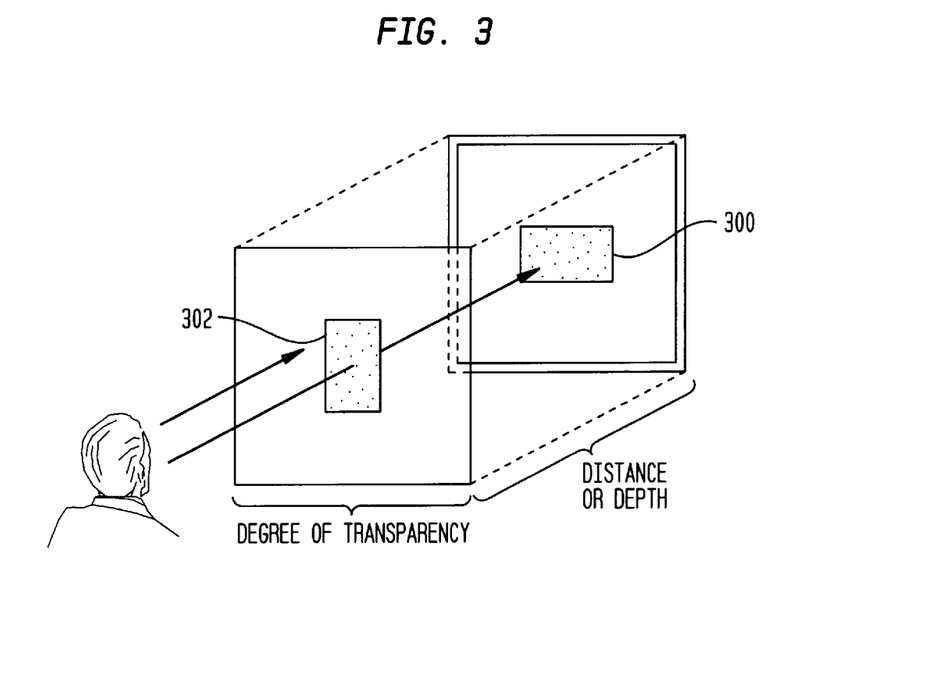
FIG. 3 illustrates a general conceptual model for transparent layered objects (foreground/background)

Thus, the first component associated with visual interference is focused attention or the ability of the user to separate the visual characteristics of each object/image and focus on any single object with minimal distraction from other objects. As illustrated in FIG. 3, with focused attention the user generally needs to ignore background objects 300 (windows or layers) and focus on foreground objects 302. Focused attention examples include: working on a document when a dialog box or warning message interrupts and selecting a pull-down menu (or pie menu) which temporarily blocks part of an active window.

As such, for focused attention, a GUI must distinguish the attributes of foreground objects as much as possible from attributes of background objects. Thus, it is generally desirable to decrease the visibility (decrease opacity) of background objects and increase the visibility (increase opacity) of foreground objects. In other words, focused attention generally requires decreasing the transparency of foreground objects.

The second user attention component is divided attention. Divided attention is the ability of the user to divide attention between two or more objects or being able to distinguish foreground and background objects or layers. Divided attention examples include: using tear-off tool palettes (which behave as tiny overlapping windows); collaborating with a partner shown in a video window, in which the user wants to glance at both the partner and the work in progress (e.g., a drawing or a document); viewing a live video conversation with one person while monitoring several video connections to others for peripheral awareness of their availability; and using an interactive dialog box to change the drawing or modeling characteristics of an underlying image, model, or animation.

Divided attention therefore requires the GUI to be able to visually separate those features that belong to the foreground and background in order to accurately perceive the corresponding objects. Thus, contrary to the requirements of focused attention, a GUI must support simultaneous visibility of both object layers, by generally increasing the opacity of background objects and increasing transparency of the foreground objects.

The third user attention component is the "switching cost" (in terms of time, mechanism, learning, and awareness)

associated with the user shifting attention from one object (or a group of objects) to another where each object (or group of objects) requires a different type of attention (i.e., focused or divided).

The studies included classifying and evaluating a variety of variably-transparent objects within different task or work spaces. Broadly defined these objects included menus (pull-down, pop-up, and radial or "pie" menus), palettes (tear-off tool menus), dialogue boxes (especially interactive scrolling dialogues), windows, and help screens. In particular, the studies utilized three types of image data: text-based, line art, and solid images. This allowed the inventors to evaluate content-based interference problems. The studies evaluated whether users could identify randomly selected icons within a palette, given the various background content.

These types of objects appear in many real applications and at least temporarily obscure part of the user task space. The degree to which these objects persist (seconds/minutes/hours) largely determines the degree of disruptiveness. In many instances, as illustrated in FIG. 3, the user's task space becomes background object 300 while other objects that appear become foreground objects 302. These foreground objects often enable the user to carry out activities or change parameters that are ultimately reflected in the now hidden background layer (e.g., color changes, font changes, and view changes).

The studies utilized two complementary approaches, which were conducted in parallel: formal experiments and realistic field studies. To reveal variation in focused and divided attention, formal experimental studies were conducted with well controlled models and simulations. See, e.g., Harrison et al., *Transparent Layered User Interfaces: An Evaluation of a Display Design to Enhance Focused and Divided Attention*, Proceedings of CHI '95, Denver, Colo., pp. 317–324 (incorporated herein by reference in its entirety). These formal experimental results provide precise measures on the user's ability to see both foreground and background objects or information (i.e., divided attention) and the visual interference upper limit for two object "layers" with varying degrees of transparency.

Realizing that the controlled experimental paradigms, as noted above, only addressed restricted sets of design dimensions, the studies also included realist applications, which tended to have a much richer work space. In the following, the formal experimental results are first discussed, followed by the findings of the realistic field studies which are the primary basis for the present invention.

In a first set of formal experiments, a very simple but robust task is performed to measure the visual interference between two layers (this is commonly referred to as the Stroop Effect). See, MacLeod, C., Half a Century of Research on the Stroop Effect: An Integrative Review, Psychological Bulletin, Vol. 109, No. 2, 163–203, 1991. In traditional Stroop tasks, a series of words is presented in randomly chosen colors (e.g., red, green, blue, and yellow). Users are correspondingly asked to identify the color while ignoring the word. Some of the words are neutral (e.g., uncle, shoe, cute, and nail), while other words are of conflicting color identification (e.g., yellow, blue, green, and red). In general, consistent and significant performance degradation occurs when conflicting color identifications are used.

Similarly, the inventors' studies included varying levels of transparency using the Stroop Effect. The Stroop test was utilized to evaluate visual interference between variably-transparent layers because the test provides a sensitive, robust, and extreme measure of the extent of visual interference. As such, the test was anticipated to indicate worst case limitations.

The test included having the users read words seen "through" a color patch. At high levels of transparency (e.g., 100%, fully transparent or clear) it was anticipated that users will experience high levels of interference from the background word when they try to name the foreground color (difficulty in focused attention). As the color patch became more opaque, the interference from the background word was anticipated to decrease or become diluted (making focused attention easier).

Figure 4:
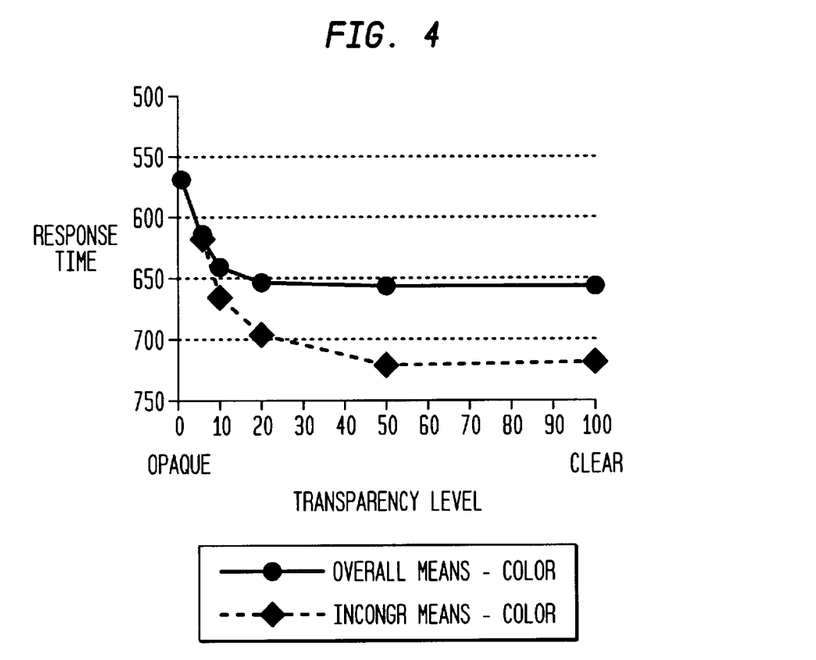
FIG. 4 illustrates Stroop experimental results with respect to varying levels of transparency.

As shown in FIG. 4, the test results indicated that for focused attention tasks (focusing on the foreground color patch while ignoring the background word), there is a rapid performance degradation between 5% and 20% transparency. Therefore, for this degradation to occur, the background word must be introducing interference at ever increasing levels. At transparency levels of 5% (and less), minimal or no interference appears to occur, thus implying that the background word is no longer visible enough to create even minor interference. As anticipated the degree of transparency did dilute the interference/Stroop Effect ($F(5, 719)=11.12$, $p<0.0001$). Note the Stroop Effect definitions are discussed in further detail below.

At the 50% transparency level, however, performance is at its worst and does not deteriorate substantially with further increases in transparency. This implies that word legibility improvements from 50% (semi-transparent) to 100% (clear, completely legible) do not further affect visual interference.

In addition, as also shown in FIG. 4, color also shows a significant main Stroop Effect ($F(3, 719)=15.51$, $p <0.0001$), suggesting that saturation or luminance also dilutes visual interference (i.e., affects word legibility).

The Stroop studies tested a specific and well-known measure of user attention for interference. However, the components used in the test were visually simplistic and dissimilar: color and text (though they are semantically conflicting). The inventors anticipated that recognition of complex or visually similar objects (e.g., text over text) would be more difficult than identification of color over text (high visual interference).

Using more realistic complex image types, the inventors distilled an understanding of where the cut-off points are for user performance and the characteristics of the performance curves. That is, with this information a GUI can be enhanced by providing "reasonable" user performance, while maintaining a visual awareness of the background images.

Accordingly, the realistic field studies involved focused attention and visual interference. In these experiments, both the visual distinctiveness and levels of transparency were varied. Users were asked to perform tool palette selection tasks where the tool palette appeared in the foreground and various images appeared in the background, similar to those illustrated in FIG. 1 and FIG. 2.

The palette transparency levels were varied randomly: at times the palette was opaque (0% transparent), blocking out the background entirely; at other times the background could be easily seen through the palette (e.g., 90% transparent). Visual distinctiveness was assessed with respect to both palette icons and various backgrounds (containing text, line art/wire-frames, and solid images). All combinations of icon types, transparency levels, and background types were tested. As with the formal experiments, these studies were run on a Silicon Graphics, Model Indy, 20 inch color monitor. Users were positioned at a fixed distance of 30 cm from the monitor (this is the average distance when working normally).

For each trial, users were shown a target icon image to study. When ready, they pressed a "next trial" button which displayed the palette superimposed over the background at some random transparency level. Icons were randomly distributed on the palette. Users were asked to locate and click on the target icon within the palette. If they could not see any items on the palette (i.e., illegible), the users could press a "can't see" button. Response times and errors were logged. The target icon remained on the screen throughout the trial for reference purposes. It was anticipated that more visual interference would occur as the transparency increased and therefore reduce the user's performance (slower response time and increased errors). Furthermore, it was anticipated a leveling-off point would be revealed where user performance did not continue to degrade.

It was also anticipated that increased complexity or information density on the background will make icon legibility decrease for all icons types. That is, text backgrounds will have the worst performance, followed by wire-frame, and then solid images.

The inventors also anticipated that visually similar (in terms of both colors and content) icons types and background types would most significantly affect performance adversely (i.e., text icons with text background, line art icons with wire-frame backgrounds, and solid image icons with solid image backgrounds).

A fully-randomized, within-user, repeated-measures experimental design was used. There were three independent variables: type of palette icon, type of background, and transparency level. A total of 576 trials were run for each user; 14 users were tested. Trials were presented in random order at 5 second intervals.

Each session lasted approximately 45 minutes. Dependent variables of selection response time (based on a mouse click) and errors were logged. Two error conditions were possible: the user pressed the "can't see" button indicating that the item was not legible, or the user selected the incorrect palette item. In the latter case, the item selected and its location were logged. Error trials were removed from subsequent analysis of response time data. Error data were analyzed separately.

Figure 5:
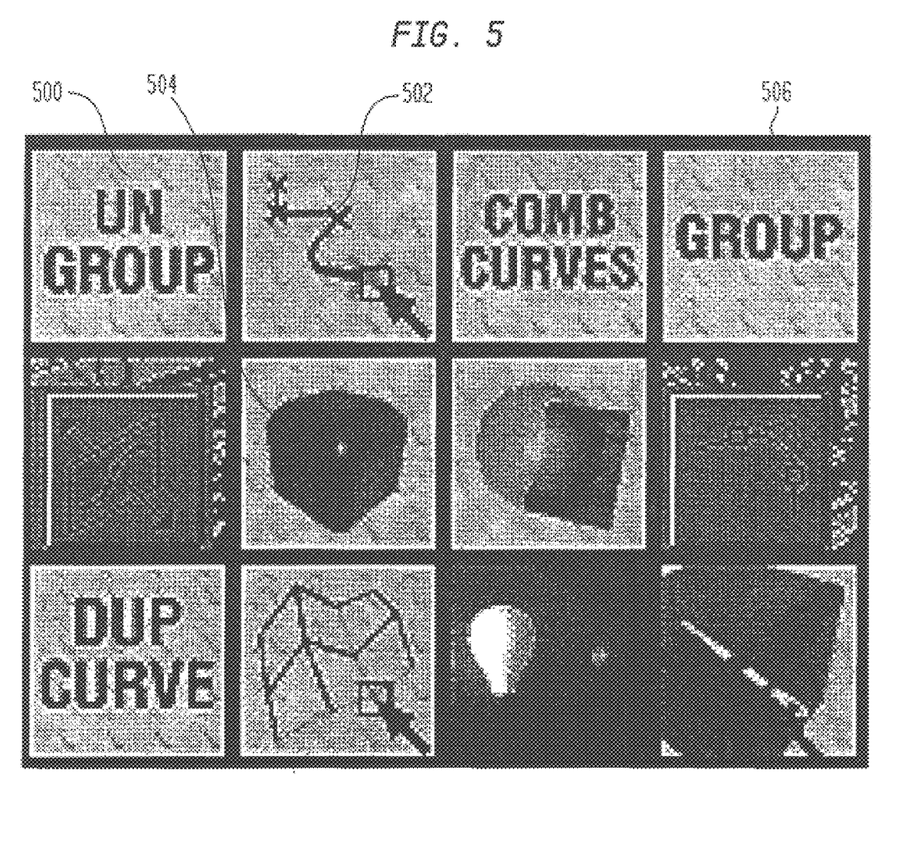
FIG. 5 illustrates a sample icon palette at 0% transparency (opaque)

As shown in FIG. 5, the studies used three icon types: text 500, line art 502, and solid rendered objects 504. The resulting tool palette 506 was 3 rows by 4 columns in size. A 12-item palette was considered to be representative of the average menu/palette size used within product on the market. Icons were randomly assigned positions within the palette for each trial. This was done to ensure the experiment was a legibility test and not confounded by users learning the position of icons. Correspondingly, users could not predict the palette location of an icon target based on the item presented; rather, the user was forced to find the icon each time. The target was presented to the user throughout the trial as a reminder. This was to prevent errors due to memory.

The test also randomly assigned background images of three types: text pages, wire-frame images, and solid images. Again four samples of each type were created. Images were 8-bit color-rendered images. These backgrounds were aligned such that a major portion of the content was directly under the palette.

Finally, the studies randomly assigned the level of transparency to the palette. These transparency levels were based on the previous experimental data (noted above, with respect to the Harrison et al. study) and the test pilot results of this experiment. Levels of 0% (opaque), 50%, 75%, and 90% (highly transparent) were used. The opaque level represented the baseline condition where the fastest performance was anticipated. Pilot results suggested minimal performance improvements between 0% (opaque) and 50% (semi-transparent) so intermediate levels within this range were not included in this experiment. Similarly, images above 90% transparency were found to be almost completely illegible and were not included.

Users were given 20 practice trials. These trials were randomly selected from the set of 576 possible combinations. Following this, users were shown the target icon for each trial and a button to start each trial when the user was ready. The users could take short rest breaks whenever necessary.

Pilot testing revealed whether there were any performance differences between 50% to 90%. Most of the noticeable differences reflected in performance and legibility seemed to occur between 90% and 50%. This pilot data accordingly was instrumental in determining the 4 transparency levels which were subsequently used.

The experimental results indicated highly statistically-significant main effects for icon type, background type, and transparency level. A significant interaction effect was found for: (icon type)×(transparency level), (background type)×(transparency level), (icon type)×(background type), and (icon type)×(background type)×(transparency level). Table 1 delineates the statistical results for main effects and interactions. All statistics reported used an alpha level=0.05.

TABLE 1

| Condition (Icon) × (Bkgrnd.) × (Transp.) | df | F value | p< |
|---|---|---|---|
| Icon Type | 11, 132 | 3.86 | .0010 |
| Bkgrnd. Type | 11, 132 | 3.84 | .0010 |
| Transp. Level | 3, 36 | 7.93 | .0050 |
| (Icon Type) × (Transp.) | 33, 394 | 2.81 | .0001 |
| (Bkgrnd. Type) × (Transp.) | 33, 368 | 6.11 | .0001 |
| (Icon Type) × (Bkgrnd. Type) | 121, 1452 | 1.68 | .0001 |
| (Icon × Bkgrnd.) × (Transp.) | 275, 2834 | 3.48 | .0001 |

The F value is the ratio test which represents: (treatment effect for variable of interest+individual differences+experimental error) divided by (individual differences+experiment error). Conceptually it contrasts the variability between treatments with the variability in data within a particular treatment. Mathematically it is computed using the mean of a sum of squares, which is the summation squared for an entire set of N scores or measurements. These sums are averaged across the entire set of measurements to give the mean value used in the F-value. Again the precise mathematical derivation is well known in the field of statistics and is governed by the following equations:

$$SS = \sum X^2 - \frac{(\sum X)^2}{N} \quad \text{mean square } MS = \frac{SS}{df}$$

$$F \text{ value} = \frac{MS \text{ between treatments}}{MS \text{ within treatment}}$$

df—represents the degrees of freedom. This is the amount that the numerator and the denominator in the statistical test are free to vary independently for a particular set of scores or measurements. It is computed by determining the number of values (a) −1 for the variable factor (which is the numerator), divided by the number of values (b) −1 for each variable, and multiplied by the number of subjects (n) or users −1 (which is the denominator). This is defined as df-total=N−1, where N is the number of trials in the entire experiment.

The df-total breaks into two component parts: the df-between-treatments=k−1 and the df-within-treatments=N−k. The df-within-treatments further breaks down mathematically into: df-between-subjects=n−1 and df-error=(N−k)−(n−1).

p is defined to be the probability that the result given would occur solely by chance. As such, it is a indicator of the statistical confidence that the factor under measurement had a strong influence on the resulting performance measured and this influence is not merely due to error in measurement technique or the normal random fluctuations that occur in data. In general, probability values of <0.01 are considered to be highly significant indicators.

A well known Student-Newman-Keuls (SNK) test was run as a comparison of means to determine the clustering of items within icon type, background type, and transparency level. In other words, the test was performed to determine whether items were or were not statistically different from each other.

For overall response time performance per transparency level, the groupings were: 90%–75% (slowest), 50%, and 0% (opaque—fastest). For background type and icon type, it was anticipated that 3 groupings occur which represent the 3 types of items (text, line art/wire-frame, and solids). In general this was the case. Text was the slowest, followed by line art/wire-frame images, and then solid images. Analysis of icon type showed that line art icons and text items resulted in performance which was not statistically different (followed by solid objects icons which were the fastest).

A detailed analysis was run at each level of transparency to determine how icons and backgrounds grouped within each transparency level. At 90% transparency, where performance was poorest, background type and icon type did not make a difference.

At 75% transparency, the 3 background groupings occurred. However, the wire frame images resulted in the slowest performance (and not the text as expected), followed by text, then solid images (fastest performance). Performance for icon types at the 75% level was in 2 groupings: text and line art icons (slowest), and solid objects (fastest).

At 50% transparency, for background types, text and wire frame performed equivalently (slowest), followed by the group of solid backgrounds. Icon types, at 50% transparency, all performed equivalently well (no statistical difference across types).

Finally at 0% (opaque), as expected, all backgrounds (where backgrounds are irrelevant to the icon selection task) performed equivalently well and all icons performed equivalently well (i.e., no statistical difference between icon types or background types).

Error trials were removed from the analysis of response time data and were subsequently analyzed separately. In total less than 1% of the trials resulted from targeting errors or misses, thus suggesting that users were not guessing when targets were difficult to detect. The error breakdown, as a percentage of total misses, is shown in Table 2.

TABLE 2

| Transparency Level | Number of Trials | % of Total Misses |
|---|---|---|
| 0% | 1 | 3% |
| 50% | 4 | 13% |
| 75% | 15 | 48% |
| 90% | 11 | 35% |

For targeting errors, in every case it was due to substituting another icon of the same category for the target icon (e.g., incorrect text icon was selected instead of the text target icon). Text icon substitutions accounted for 42% of total targeting errors, solid object icon substitution 19%, and line art icon substitution 22.5%. No targeting errors were due to accidental selection of adjacent items in the palette, thus suggesting the icon size used was adequate.

The most frequent source of "error" were trials that the users marked as "can't see" (likely preventing the users from guessing randomly, as reflected in the low targeting error rates). In total, 21.5% of the total trials were marked "can't see" by the users. The breakdown, by transparency level, is shown in Table 3. Note that almost ⅔ of the errors occurred at the 90% level.

TABLE 3

| Transparency Level | Number of Trials | % of Total Misses |
|---|---|---|
| 0% | 0 | 0% |
| 50% | 9 | 1% |
| 75% | 163 | 23% |
| 90% | 448 | 62% |

At the 90% level, all of the icon types appearing over text or wire-frame backgrounds were marked illegible. Interestingly, only 4% of the illegible trials at 90% transparency were solid backgrounds. A breakdown, by (icon type) X (background type) is shown in Table 4.

TABLE 4

| (Icon Type) × (Bkgrnd. Type) | Transp. Level | Number of Trials | % of Error Trials |
|---|---|---|---|
| (line art) × (text) | 50% | 4 | 44% |
| (line art) × (wire-frame) | 50% | 5 | 56% |
| (text) × (text) | 75% | 35 | 22% |
| (line art) × (text) | 75% | 13 | 8% |
| (solid) × (wire-frame) | 75% | 29 | 18% |
| (line art) × (wire-frame) | 75% | 54 | 33% |

As shown in Table 4, line art icon types appear the most problematic across transparency levels. These account for almost half of the legibility errors for levels of 50% to 75% transparency.

Figure 6:
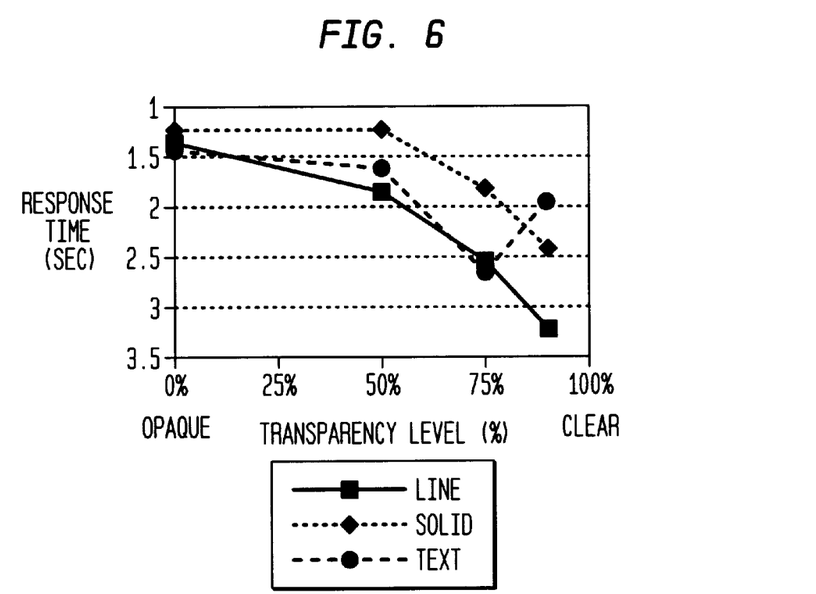
FIG. 6 illustrates a plot of mean response times for (transparency levels) X (icon type) (across all background types) based on experimental analysis.
Figure 7:
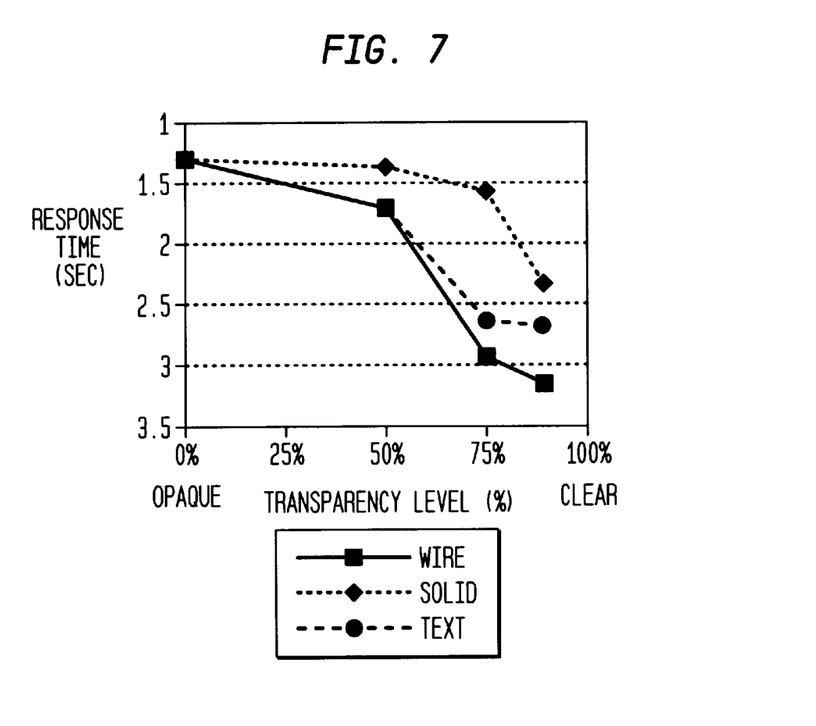
FIG. 7 illustrates a plot of mean response times for (transparency levels) X (background type) (across all icon types) based on experimental analysis.
Figure 9:
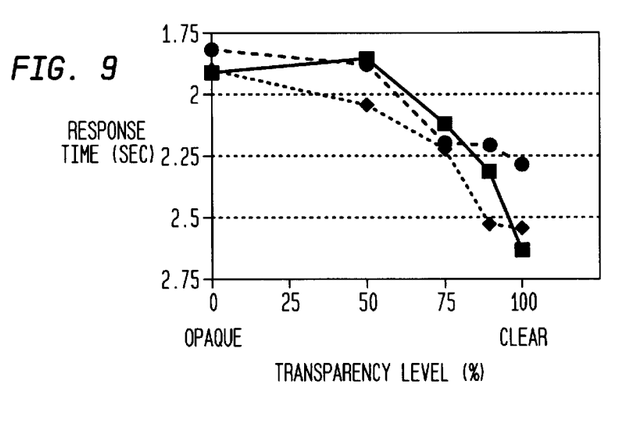
FIG. 9 illustrates a plot of mean response times for (transparency levels) X (wire-frame background type) (across all fonts) based on experimental analysis.
Figure 10:
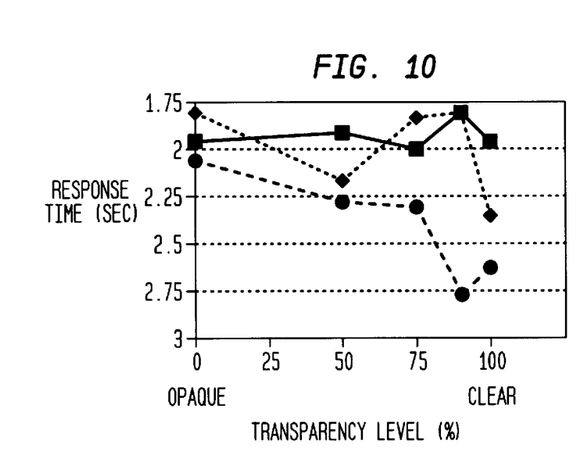
FIG. 10 illustrates a plot of mean response times for (transparency levels) X (text page background type) (across all font types) based on experimental analysis.
Figure 11:
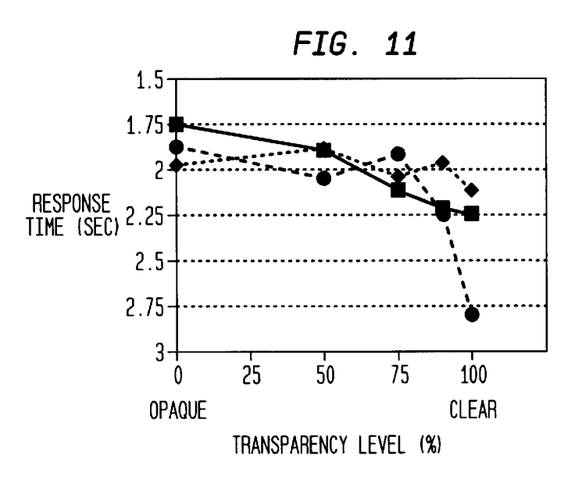
FIG. 11 illustrates a plot of mean response times for (transparency levels) X (solid background types) (across all font types) based on experimental analysis.

Thus, these studies (and other related studies conducted by the inventors) indicate unexpected results. That is, across any type of icon or object (i.e., independent of graphics), levels of up to approximately 50% transparency (i.e., 0% to 50% alpha blending of the two objects layers) do not reduce subsequent performance factors in a mathematically significant manner from performance baselines measured at the opaque menu level. This is illustrated in FIG. 6 which is a plot of the mean response times for (transparency levels)×(icon type) (across all background types). Moreover, these studies show this finding to be wholly independent of the application context (e.g., work processing, 2D and 3D modeling, and rendering), as shown in FIG. 7 which is a plot of mean response times for (transparency levels)×(background type) (across all icon types). Corresponding applications in word processing or text manipulation as well as applications in 2D and 3D modeling were found to be severely affected for transparency levels above the 50% level. FIG. 9 is a plot of the mean response times for (transparency levels)×(wire-frame background type) (across all fonts), and FIG. 10 which is a plot of the mean response times for (transparency levels)×(text page background type) (across all font types). FIG. 11 is a plot of the mean response time for (transparency levels)×( solid image background) (across all font types).

Correspondingly, there is minimal, if any, performance deterioration or a penalty for substituting, for example, 50% transparent menus (windows or icon palettes) for traditional opaque menus.

In addition, these studies revealed that the upper threshold level for icons and other objects was found to be approximately 75% (i.e., alpha blended 75% of background, 25% of icon image), as shown in FIG. 6. Transparency above this level is generally unusable without additional enhancement techniques. One such technique involves the use of anti-interference outlines, as described in the related to commonly owned, co-pending application Ser. No. 08/978,524 file wrapper continuation of Application No. 08/634,185, filed on the same date herewith, titled "Graphical User Interface With Anti-Interference Outlines For Enhanced Variably-Transparent Applications," which is herein incorporated by reference in its entirety.

Figure 8:
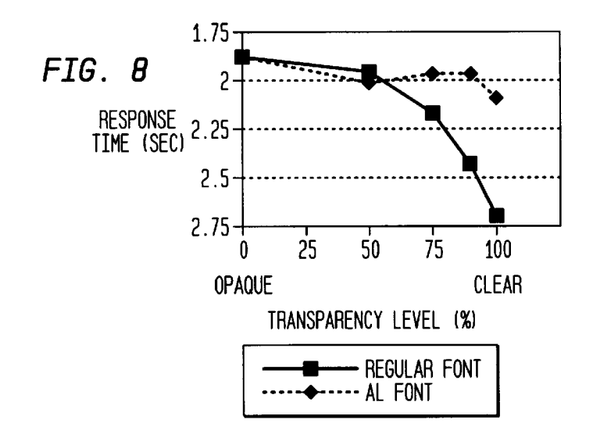
FIG. 8 illustrates a plot of mean response times for (transparency levels) X (font style) (across all background types) based on experimental analysis.

Indeed, anti-inference outlines, when applied to text menu items, generate performance which is impervious to changes in transparency at even more substantial levels beyond the confirmed 50% threshold. Transparency levels up to approximately 90% (i.e., alpha blended 90% of the bottom layer, 10% of the top layer) produce no significant statistical or mathematical differences in performance over the opaque menus. Standard fonts reach a minimum acceptable performance threshold at 75% transparency, as shown in FIG. 8 which is a plot of mean response times for (transparency levels) X (font style) (across all background types).

Moreover, transparency levels above approximately 90% (i.e., alpha blended 90% of bottom layer, 10% of top layer) produce significant statistical and mathematical differences in performance. This performance threshold is also generally independent of graphics or application.

These studies indicate that applications such as solid image rendering, image processing, video, and scanned imagery are the most resistant to visual interference effects, and can therefore withstand higher transparency levels, over the other application domains tested (e.g., word processing, and 2D/3D modeling with wire-frame images). These types of applications produce reasonable performance results at up to approximately 75% transparency, even under worse case conditions (e.g., black object on black background) and remain usable up to approximately 90% transparency, as shown in FIG. 11 which is a plot of mean response times for (transparency levels)×(solid background types) (across all font types). Performance is substantially improved, however, over the 75% level, with enhancement techniques, such as anti-interference outlines, as shown in FIG. 7 and FIG. 8.

Figure 13:
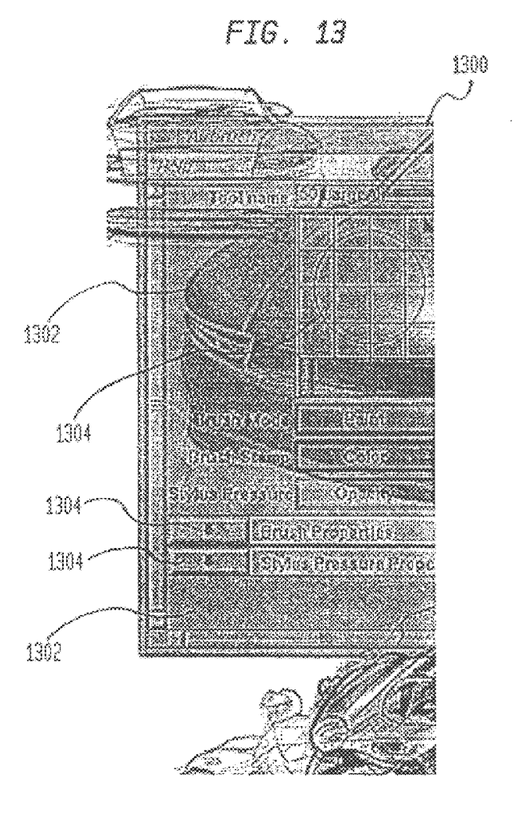
FIG. 13 illustrates transparency applied to both surface and non-surface window components.

The present invention accordingly utilizes these derived values of transparency to determine optimal levels to be set based on the foreground image or object properties (i.e., text versus line art versus solid image) and based on the expected background image properties. For example, as illustrated in FIG. 13, the transparent regions controlled by the present invention include background (or "surface") areas 1302 of a window 1300 and may optionally include other window components, such as "non-surface" components 1304. That is, the present invention subdivides window 1300 into surface area 1302 and non-surface area 1304, where surface area 1302 is defined to be the textured or colored backdrop of window 1300 upon which non-surface components 1304 are drawn. An embodiment of the present includes automatically applying transparency with the optimal thresholds to surface area 1302 and independently and dynamically determining whether to apply transparency to non-surface components 1304. Accordingly, the structure of window 1300 can be determined at application creation or invocation time.

Figure 14:
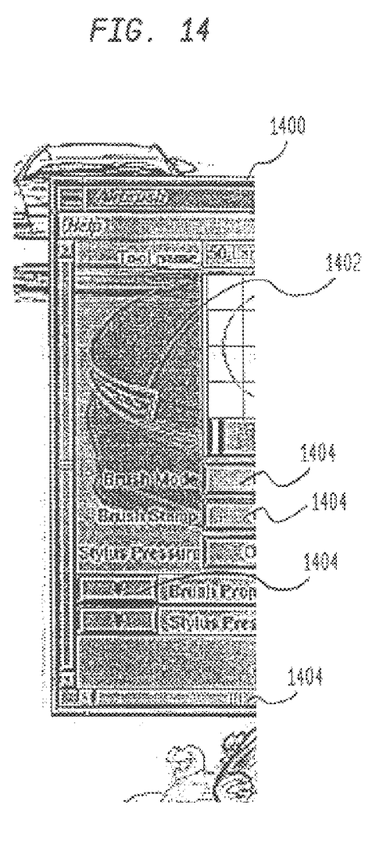
FIG. 14 illustrates a hybrid window having semi-transparent surface area components and opaque non-surface area components.
Figure 15A:
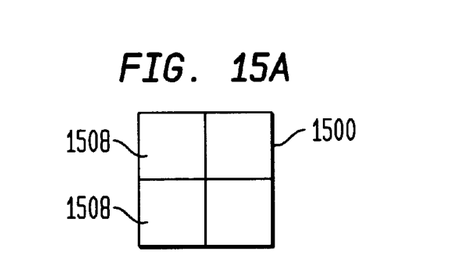
FIGS. 15A–D illustrate images of various discrete transparency levels 0%, 25%, 50%, and 75%) generated with a 4-bit mask.
Figure 15B:
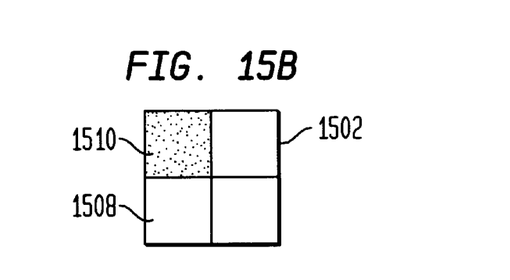
Figure 15C:
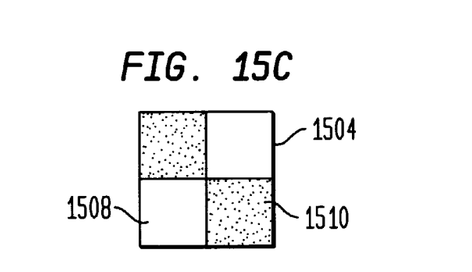
Figure 15D:
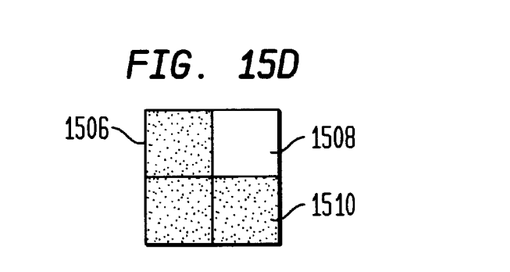

Correspondingly, as illustrated in FIG. 14, the present invention can be used to provide a hybrid (or integrated) window 1400 having variably-transparent surface area components 1402 and opaque non-surface area components 1404. In particular, non-surface components 1404 are "selectable objects" within window 1400. Selectable objects are those which activate a command based on positioning the cursor over them and clicking a mouse or pressing any key on a keyboard. Selectable objects are typically non-surface components, such as buttons, sliders, radius indicators, etc. As would be apparent to a person skilled in the relevant art, additional non-surface area objects which do not invoke commands (e.g., text labels) can also be opaque.

General Hardware/Software Environment

Figure 12:
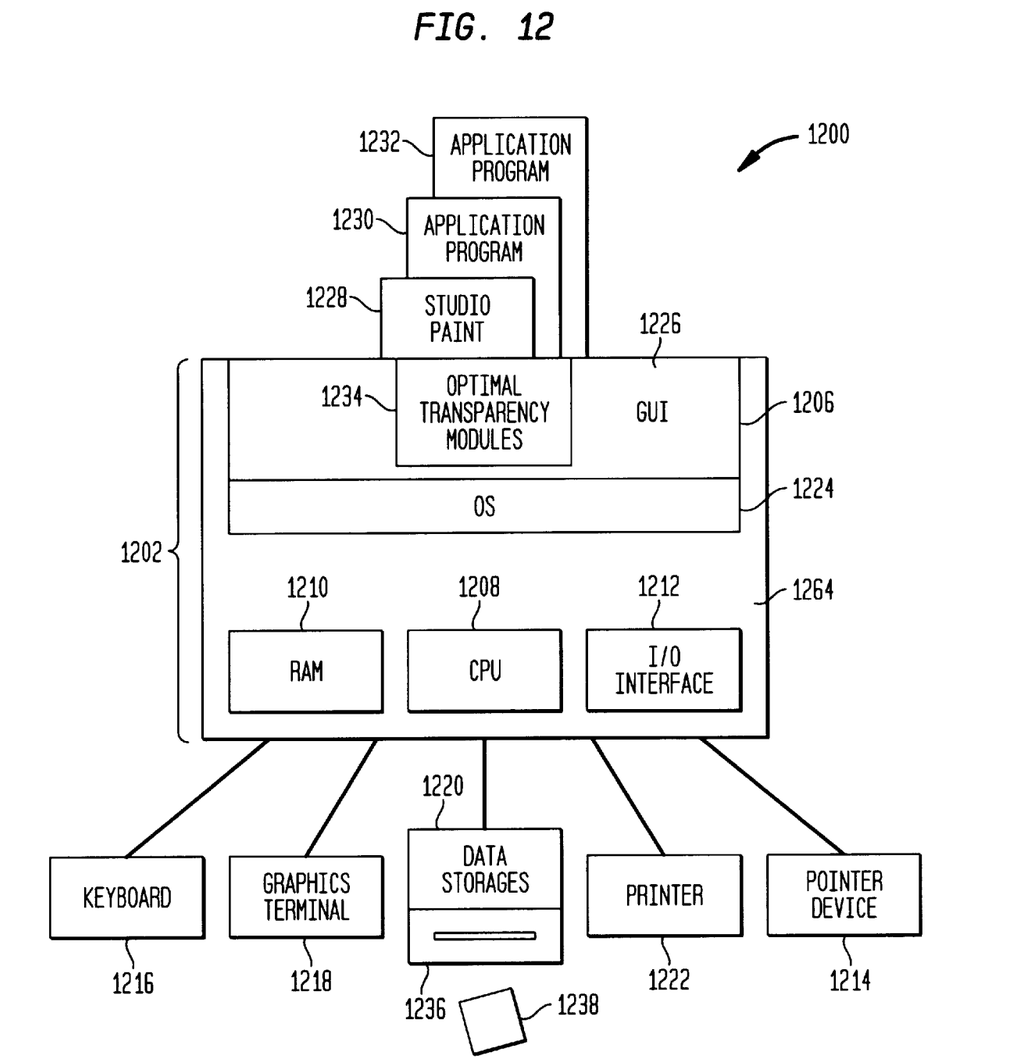
FIG. 12 illustrates a general hardware/software environment of a preferred embodiment of the present invention.

Utilizing these optimal transparency thresholds, the present invention provides a GUI for maximized user performance and improved system efficiency. FIG. 12 illustrates a general hardware/software environment 1200 in which a preferred embodiment of the present invention can operate. Environment 1200 includes a computer platform 1202 having a hardware unit 1204 and a software unit 1206. Hardware unit 1204 includes a central processing unit (CPU) 1208, random access memory (RAM) 1210, and an input/output (I/O) interface 1212.

While any personal computer, workstation, or mainframe computer can be utilized with the present invention, in this preferred embodiment, hardware unit 1204 is a Silicon Graphics Workstation, Model Indy, manufactured by Silicon Graphics Incorporated (SGI), 2011 North Shoreline Boulevard, Mountain View, Calif., 94039-7311. As such, CPU 1208 is a processor from the MIPS family of processors including processors from the R4000 or R8x00 family. Alternatively, the present invention can use any commercially available SGI workstation (e.g., Model Indigo2) for hardware unit 1204.

Hardware unit 1204 is also operably connected to a number of peripheral devices including a pointer device 1214 (e.g., mouse or puck), a keyboard 1216, a graphics terminal 1218, secondary storage devices 1220, and a printer 1222. Secondary storage devices 1220 can include, for example, a hard disk drive (not expressly illustrated in FIG. 12) and/or a removable storage drive 1236, representing a floppy disk drive, a magnetic tape drive, a compact disk (CD) drive, and the like. A removable storage unit 1238 (e.g., a floppy disk, a magnetic tape, or CD) is included for use with removable storage drive 1236.

Software unit 1206 includes an operating system (OS) 1224 and a graphical user interface (GUI) 1226. In this preferred embodiment, OS 1224 is an IRIX operating system, version 5.3 or greater, and GUI 1226 is an X11 interface, version 6, both of which are available from SGI. It is noted that the term GUI, as used herein, is not intended to narrowly denote a discrete layer of software or hardware. Rather the scope of the term GUI is intended to encompass any combination of software techniques (implemented within an OS, a discrete GUI software layer, an application program, or any combination thereof).

Environment 1200 further includes a number of application programs 1228, 1230, and 1232 layered over software unit 1206. In this preferred embodiment, application program 1228 is StudioPaint 3.0, beta version, from Alias/Wavefront, 110 Richmond Street East, Toronto, Ontario, Canada M5C 1P1. Application program 1228, in conjunction with OS 1224 and GUI 1226, handles user inputs from pointer device 1214 and a keyboard 1216. Application program 1228 also outputs a series of graphic commands to facilitate the images/representations (i.e., detailed geometric descriptions and attributes) of objects/data displayed on graphics terminal 1218.

In this preferred embodiment, the present invention is implemented as optimal transparency modules 1234, which are incorporated into GUI 1226 thereby providing the features of the invention across a plurality of application programs (e.g., application programs 1228, 1230, and 1232). As would be apparent to a person skilled in the relevant art, however, the present invention can alternatively be incorporated into any OS (e.g., OS 1224) or any application program (e.g., application programs 1228, 1230, and 1232).

As would be apparent to a person skilled in the art, the present invention can also be implemented in hardware as part of RAM unit (1210), CPU unit (1208), I/O unit (1212) or as a new hardware Rendering/Graphics unit independent of, but integrated with, those hardware units shown in FIG. 1200. This hardware unit would allow for image buffering, off-screen rendering, read/write access. The hardware could be pre-configured to perform alpha blending algorithms at predetermined levels based on the settings provided by the OS (1224), settings specific to a particular machine type, or setting determined by the application (1228, 1230, 1232). Settings are determined based on the values set forth by this invention document.

In those embodiments of the present invention which provide hybrid windows (as illustrated in FIG. 14), opaque regions could be buffered in either hardware and software as unchanging objects. Accordingly, only the transparent regions would require on-going computation and re-blending using specialized alpha blending algorithms or hardware rendering and blending algorithms.

The present invention significantly enhances system performance. That is, the optimal thresholds of the present invention facilitate more insightful use of visual enhancement techniques. That is, the optimal thresholds provided by the present invention facilitate more insightful use of visual enhancement techniques. For example, these thresholds allow system designers to predetermine the optimal transparency levels required by any particular application. As such, image blending techniques can accordingly be embodied in system hardware to allow fast computational performance. Alternatively, or in addition to, hardware algorithms, such optimized, predetermined solutions can also be generated in higher efficiency programming languages (i.e., by using assembly language, register-based operations, or look-up tables). These optimizations are typically not cost-effective or efficient without the ability to predict the required parameters in advance.

Optimal Transparency Modules

In the preferred embodiments of the present invention, transparency models (which do not require realistic illumination effects such as refraction or diffusion of light) are used. Given the context of the present invention of enhancing focused and divided user attention (or awareness) with respect to multiple overlapping GUI objects, use of more complex models is generally not required. Notwithstanding this context, however, the teaching present invention are also applicable with these complex models.

Accordingly, the embodiments of the present invention do not generally require the specification of lighting sources, light intensity and angles, surface substances and refractive properties, and the properties of nearby or underlying surfaces. As such, potential problems with maintaining image resolution, visibility, and legibility of underlying objects are significantly reduced. Moreover, applying such simplifications, more computational efficient algorithms are formed without compromising the intended purpose or functionality.

Achieving non-refractive variable-transparency (surfaces with a distortion less views) of underlying object can be accomplished in a number of well known techniques (methods or algorithms). The teaching of the present invention allowing system designers to optimize the choice of algorithm type as well as enhance it specific implementation. The two such techniques discussed herein, with respect to the preferred embodiment of the present invention, include stippling which uses a bit-mask (a discrete algorithm) and alpha blending (a continuous algorithm).

Discrete algorithms: As discussed herein any algorithm capable of producing only specific, discontinuous transparency levels, is discrete. Most of these algorithms create a transparency effect by turning off and on various pixels thereby creating a "mask." These methods have been called dithering, stippling, XORing, and "screen-door transparency." For example, see Foley, J. D. et al., *Computer Graphics: Principles and Practice,* 2nd ed., Addison-Wesley Publishing Co., Reading, Mass. (1990).

Mask bits which are "on" select an associated pixel from a foreground image; mask bits which are "off" select an associated background image pixel. Accordingly, masks always work using a binary decision criteria. The ratio of on/off pixels determines how much each of the foreground and background image contribute to the resulting combined image. For example, a 4-bit mask creates 4 discrete possible levels are possible (and no other levels in between). This concept is illustrated in FIG. 15A–D which include: a 100% foreground image 1500, a 75% foreground and 25% background image 1502, a 50% foreground and 50% background image 1504, and a 25% foreground and 75% background image 1506, respectively (pixels 1508 represented in white are from the foreground image and pixels 1510 represented in black are from the background image). Using more mask bits correspondingly increases the number of discrete levels possible.

Discrete transparency algorithms are generally simple to specify and the mask can be predefined and saved. Correspondingly, the individual properties (e.g., color component) of either foreground or background image are not required. As such, minimal computation is required since the mask merely directs the system where to take resulting pixel from. The pixel content itself is remains unchanged.

Figure 16:
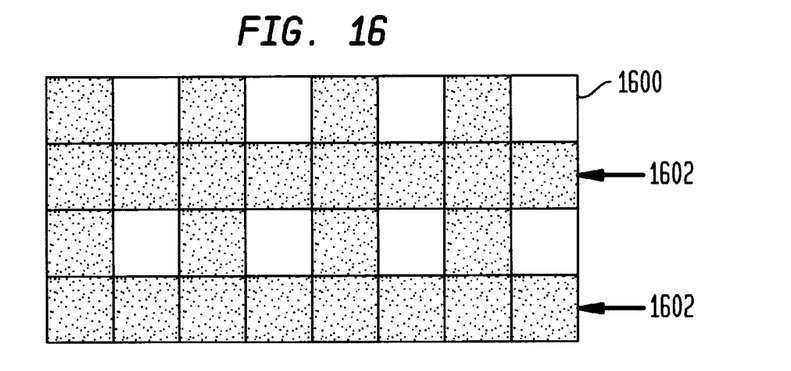
FIG. 16 illustrates an image generated with a 4-bit mask and alternating grid lines of the background image.

However, only a finite number of levels are possible and the resulting combined image often has visually disruptive features such as grid lines or other graphical artifacts. These grid lines result from the alignment of pixels taken from a single image plane. For example, with reference to FIG. 16, applying a 4-bit mask across an image 1600 (4 by 2 mask applications) results in alternating grid lines 1602 of the background image. As such, by utilizing a 50% semi-transparent mask which alternates on/off pixels or a dithered mask these limitations are overcome (e.g., grid lines).

Accordingly, by applying the appropriate optimal transparency threshold values of the present invention in advance of implementation, the system designer can accurately predict the optimal bit-mask size required and the configuration for this mask (i.e., how many bits are allocated for on and off within the mask). For example, to achieve a 50% optimal level an alternating on/off 4-bit mask can be used. To achieve a 90% transparency effect, a 16-bit mask (or more) is appropriate.

Continuous algorithms: As discussed herein any algorithm capable of producing any transparency level is continuous. Most of these well known methods or algorithms create a transparency effect by the computational combining or blending attributes of the foreground pixel with attributes of the background pixel in a predetermined proportion. The resulting new pixel is the combined image. These methods have been generally referred to as interpolated transparency, alpha blending, or filtered transparency. See, Foley, J. D. et al., *Computer Graphics. Principles and Practice,* 2nd ed., Addison-Wesley Publishing Co., Reading, Mass. (1990). With such, any transparency level may be specified without graphical artifacts resulting. For this reason, continuous algorithms are more flexible than discrete algorithms. However, such algorithms require more computational resources and are therefore generally less efficient in terms of system performance. In addition, continuous type of algorithms require some form of off-screen rendering or buffering and rendering. For this reason, even with hardware to support increased rendering speeds, these algorithms are slower in contrast to discrete algorithms.

In the preferred embodiment, an alpha blending algorithm is utilized to compute resulting pixels based on the combined red (R), green (G), blue (B), and α values for both the foreground and background image pixels in accordance with the following equation:

$$I=\alpha I_1+(1-\alpha)I_2$$

where I is the resulting color intensity, $I_1$ is the color intensity of the foreground image pixel, $I_2$ is the color intensity of the background image pixel, and α is the specified transparency level between 0 and 1 (0=clear and 1=opaque). As discussed above, the specific implementation of this algorithm is enhanced by incorporating (in machine code or hardware) the predetermined optimal transparency levels of the present invention thereby accelerating the computation of resulting blended images and simplifying the resulting code.

Pseudocode:

The following illustrates a high-level program flow of the preferred embodiment in accordance with the present invention:

```
Transparency-thresholds
    if transparency feature is turned ON then
        apply transparency (50%)
        set minimum transparency level to 50%
    endif
    case:
        application program is text based or modeling based then
            restrict upper limit to 75%
        application program is modeling or wire frame based
            restrict upper limit to 75%
        application program is animation, drawing, painting, or
        video based
            restrict upper limit to 90%
        all others
            restrict upper limit to 50%
    endcase
    Create GUI for setting transparency(upper limit, lower limit)
    if upper limit > 50% AND
    transparency level is increased > 50%
        apply anti-interference outline enhancement
    endif
end Transparency-thresholds
```

Other Embodiments

Another embodiment of the present invention is a computer program product. As with the preferred embodiment above, this preferred embodiment also has a general hardware/software 1200 as shown in FIG. 12.

Removable storage unit 1236 (alternately referred to as a computer program product or a program storage device) includes a computer usable storage medium having stored therein computer programs/software and/or data. Such computer programs, when executed, enable computer system 1202 to perform the features of the present invention as discussed herein. In particular, the computer programs, when executed, enable CPU 1208 to perform the features of the present invention. Accordingly, such computer programs represent controllers of computer platform 1202. Alternatively, the computer programs (also called computer control logic) can also be stored in read only memory (ROM), random access memory (e.g., RAM 1210), and/or other secondary storage medium, such as a CD.

In another embodiment, the present invention is implemented primarily in hardware using, for example, a finite state machine. Implementation of such a finite state machine so as to perform the functions described herein will be apparent to persons skilled in the relevant art(s).

While the present invention has been particularly shown and described with reference to several preferred embodiments thereof, it will be apparent to a person skilled in the relevant art that various changes in form and details may be made therein without departing from the spirit and scope of the invention as defined in the appended claims.

What is claimed is:

1. A system having a graphical user interface in which variably-transparent objects are displayed thereon, the system comprising:

a generator for generating variably-transparent foreground and background objects for display on the graphical user interface;

a controller for controlling a transparency level of said foreground objects, wherein said controller presets said transparency level at a minimum of approximately 50 percent transparency; and a limiter for setting a plurality of transparency level upper limits, wherein each of said upper limits sets a maximum transparency level for objects associated with an application type.

2. The system according to claim 1, further comprising an adjuster for adjusting said transparency level within a range of 0–100 percent transparency.

3. The system according to claim 1, wherein said generator uses alpha blending to generate said foreground objects.

4. The system according to claim 1, further comprising an application program, wherein said generator, said controller, and said limiter are incorporated into said application program.

5. The system according to claim 1, further comprising an operating system and a plurality of application programs, wherein said generator, said controller, and said limiter are incorporated into said operating system.

6. The system according to claim 1, wherein said generator, said controller, and said limiter are incorporated into a hardware subsystem.

7. The system according to claim 1, further comprising a hybrid window displayer, operably connected to said generator, said controller, and said limiter, for displaying on the graphical user interface a hybrid window having one of said foreground objects, one of said background objects, and an opaque foreground object.

8. The system according to claim 7, wherein said opaque foreground object is a user selectable object.

9. The system according to claim 1, further comprising a window displayer, operably connected to said generator, said controller, and said limiter for displaying on the graphical user interface a window having surface area objects and non-surface area objects, wherein said window displayer automatically provides transparency to said surface object and said window displayer independently determines whether to apply transparency to said non-surface area objects.

10. The system according to claim 1, wherein said limiter sets a transparency level upper limit of approximately 75 percent for objects associated with user interactive text-based applications.

11. The system according to claim 1, wherein said limiter sets a transparency level upper limit of approximately 75 percent for objects associated with modeling based applications.

12. The system according to claim 1, wherein said limiter sets a transparency level upper limit of approximately 90 percent for objects associated with animation based applications.

13. The system according to claim 1, wherein said limiter sets transparency level upper limits of approximately 75 percent for objects associated with user interactive text-based applications, approximately 75 percent for objects associated with modeling based applications, and approximately 90 percent for objects associated with animation based applications.

14. A computer program product for displaying objects on the monitor, the computer program product comprising:
   a computer usable medium having a computer readable program code embodied in said medium for enabling the computer system to provide the variably-transparent objects, said computer readable program code comprising:
   a generator for enabling the computer system to generate variably-transparent foreground and background objects for display on the graphical user interface;
   a controller for enabling the computer system to control a transparency level of said foreground objects, wherein said controller presets said transparency level at a minimum of approximately 50 percent transparency; and
   a limiter for enabling the computer system to set a plurality of transparency level upper limits, wherein each of said upper limits sets a maximum transparency level for objects associated with an application type.

15. The computer program product according to claim 14, wherein said limiter sets a transparency level upper limit to approximately 75 percent transparency for objects associated with user interactive text based applications.

16. The computer program product according to claim 14, wherein said limiter sets a transparency level upper limit to approximately 75 percent transparency for objects associated with modeling based applications.

17. The computer program product according to claim 14, wherein said limiter sets a transparency level upper limit to approximately 90 percent transparency for objects associated with animation based applications.

18. The computer program product according to claim 14, wherein said generator uses stippling to generate said foreground objects.

19. The computer program product according to claim 14, wherein said generator and said controller are incorporated into a graphical user interface program.

20. The computer program product according to claim 14, further comprising a hybrid window displayer for displaying a hybrid window having one of said foreground objects, one of said background objects, and an opaque foreground object.

21. The computer program product according to claim 14, further comprising a window displayer for displaying a window having surface area objects and non-surface area objects, wherein said window displayer automatically provides transparency to said surface object and said window displayer independently determines whether to apply transparency to said non-surface objects.

22. The computer program product according to claim 14, wherein said limiter sets transparency level upper limits to approximately 75 percent transparency for objects associated with user interactive text based applications, approximately 75 percent transparency for objects associated with modeling based applications, and approximately 90 percent transparency for objects associated with animation based applications.

23. A method providing variably-transparent objects, the method comprising steps of:
   generating variably-transparent foreground and background objects for display on a graphical user interface;
   controlling a transparency level of said foreground objects, including presetting said transparency level to a minimum of approximately 50 percent transparency; and
   setting a plurality of transparency level upper limits, wherein each of said upper limits sets a maximum transparency level for objects associated with an application type.

24. A system having a graphical user interface in which variably-transparent objects are displayed thereon, the system comprising:
   generating means for generating variably-transparent foreground and background objects for display on the graphical user interface;
   controlling means for controlling a transparency level of said foreground objects, wherein said controlling means presets said transparency level at a minimum of approximately 50 percent transparency; and
   limiting means for setting a plurality of transparency level upper limits, wherein each of said upper limits sets a maximum transparency level for objects associated with an application type.

* * * * *